March 8, 1949.  T. WILSON  2,463,839
MOUSE AND RAT TRAP
Filed May 15, 1947  2 Sheets-Sheet 1
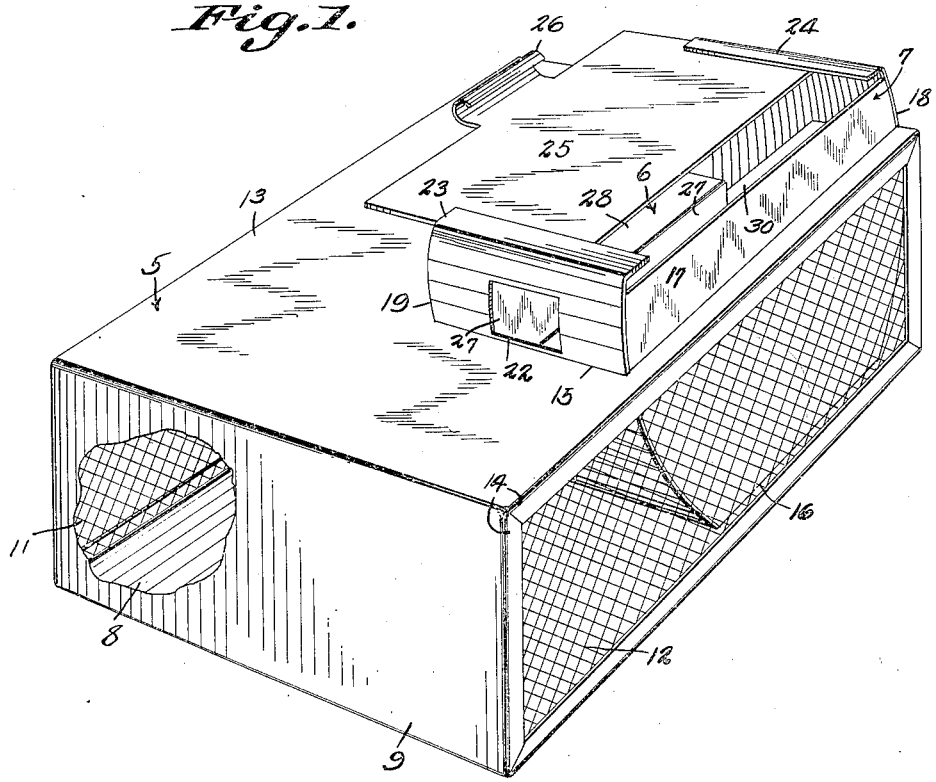
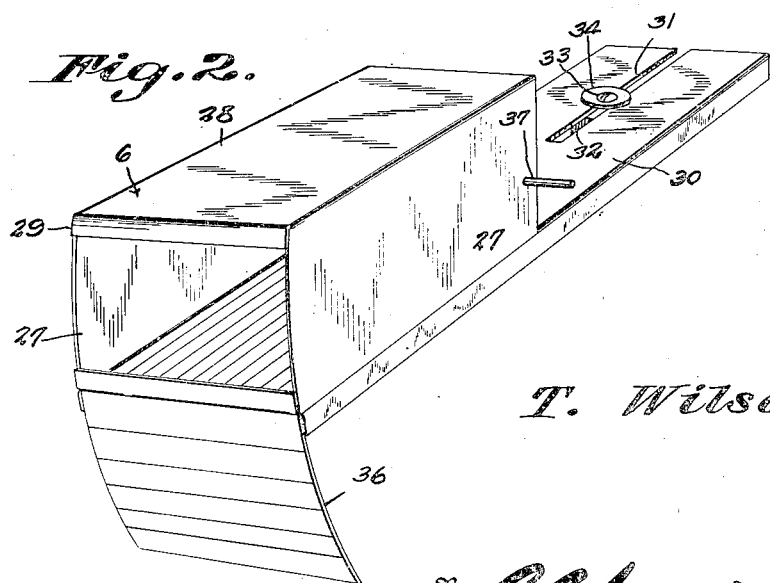
T. Wilson
Inventor March 8, 1949. T. WILSON 2,463,839
MOUSE AND RAT TRAP
Filed May 15, 1947 2 Sheets-Sheet 2
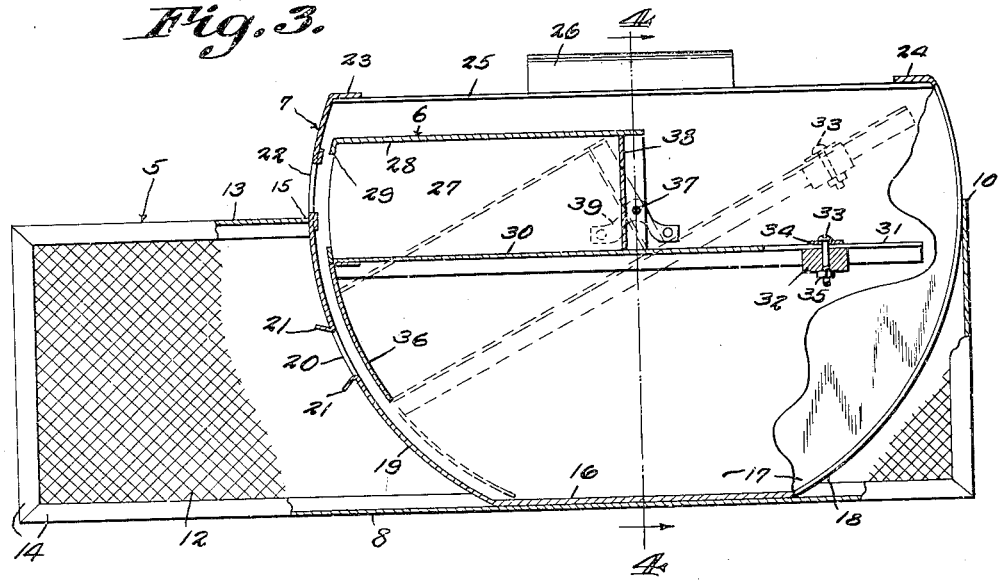
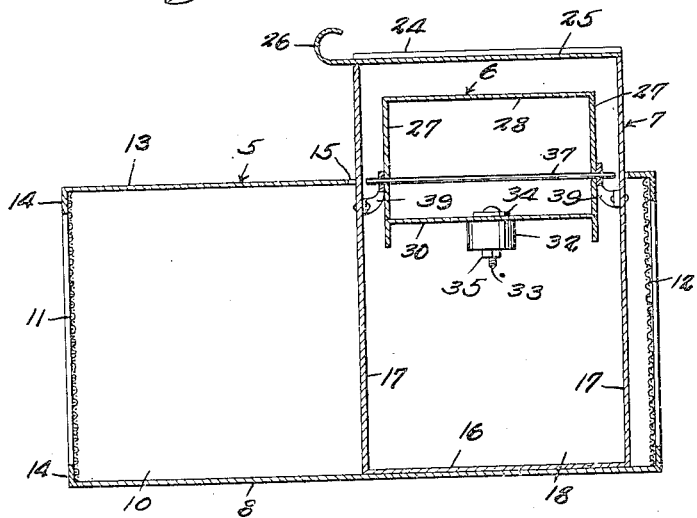
T. Wilson
Inventor Patented Mar. 8, 1949

2,463,839

UNITED STATES PATENT OFFICE 2,463,839

MOUSE AND RAT TRAP

Tom Wilson, Lake Village, Ark.

Application May 15, 1947, Serial No. 748,215

4 Claims. (Cl. 43—69)

This invention relates to animal traps, and has particular reference to a novelty designed trap specifically adapted to entrap small animals, such as mice and rats.

The primary object of the invention is to provide a trap of novel formation, so constructed as to constitute an unusually efficient means for attracting, and trapping without possibility of escape, the mice or rats.

A further important object of the invention is to provide a trap which does not depend in any way upon the use of springs or triggers for operation, it being well known that this type of trap construction has had the disadvantages of frightening the mice, often permitting them to escape before they can be caught. Additionally, it is well known that this type of trap is unsafe in many respects, and may injure the user, if he is not careful, and in fact, even where more than ordinary care is exercised.

Still another object of the invention is to provide a trap which automatically resets itself in position for catching additional animals, thus permitting the trapping of a considerable number of animals without attention from the user.

Still another object of the invention is to provide a trap that is capable of easy disassembly, thus providing a desirable sanitary feature, in that cleaning is permitted without difficulty.

A further important object of the invention resides in the provision of a trap that is capable of being used indefinitely, and is relatively simple and durable in construction, a feature which is desirable from the standpoint of manufacture and sale thereof.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings

Figure 1 is a perspective view of a trap constructed in accordance with the invention, a portion thereof being cut away for the purpose of revealing details of construction, and a slidable cover being shown in partially opened position, for the same purpose.

Figure 2 is a perspective view of a receiving or inner cage embodied in the trap.

Figure 3 is a view of the trap, shown partly in side elevation, and partly in longitudinal vertical section.

Figure 4 is a transverse vertical sectional view through the trap, taken on line 4—4 of Figure 3.

Referring to the drawings in detail, my trap comprises basically three distinct parts or units, which when constructed and assembled as hereinafter described, cooperate to receive and entrap the animals, without possibility of escape. These constitute a main or outer cage, which has been designated generally by the reference character 5, a receiving or inner cage designated generally by the reference character 6, and a box 7 in which the inner cage 6 is pivotally mounted, the box 7 being mounted in the outer cage 5.

Referring to the outer cage 5, this is of substantially rectangular construction, having a flat base 8, a front end wall 9, a rear end wall 10, screen side walls 11 and 12, and a flat top 13. In constructing and assembling the outer cage 5, the base, end walls, and top may be formed from a single length of flat sheet material, bent to provide a rectangular outline when viewed in side elevation, and having its ends fixedly joined together, as by welding or any other suitable means. The screen side walls 11 and 12 can be joined to these members by any suitable means, as by being soldered to flanged edges 14 of said members. Obviously, other methods of assembly may suggest themselves, without departure from the spirit of the invention as claimed.

In the top 13 of the outer cage 5 is cut a relatively large rectangular opening 15 in which is received the box 7 mentioned above. As clearly shown in Figures 1 and 4, the opening 15 is disposed rearwardly, relative to the outer cage 5, and has one side edge spaced closely to one side edge of the top 13.

Referring to the box 7, this unit is formed with a bottom 16, which is flat, and is adapted to rest on the bottom 8 of the outer cage. In width, as shown particularly in Figure 4, the bottom 16 is only slightly smaller than the distance between the side edges of the rectangular opening 15. Longitudinally, however, the bottom 16 of the box 7 is considerably shorter than the length of the rectangular opening 15.

From the side edges of the bottom 16 are extended upwardly side walls 17 of the box 7, that are also flat, and are perpendicularly disposed to the bottom 16. These are extended upwardly through the opening 15, and project above the top 13 of the outer cage 5. The box 7 is additionally provided with a closed rear end wall 18.

As shown particularly by Figure 3, this curves outwardly and upwardly from the bottom 16, so as to engage the rear edge of the rectangular opening 15. Preferably, the curvature of the rear end wall 18 is in the form of an arch, so as to constitute, with the front end wall 19 of the box 7, a portion of a circle.

The front end wall 19 is formed, intermediate its bottom edge and the point at which it is projected through the opening 15, with an opening 20, which as will be described hereinafter, serves as an outlet opening from the inner cage 6 into the outer cage 5. The opening 20 is preferably formed with outwardly directed flanged edges 21, that may conveniently be provided by bending outwardly the material from which the opening 20 is formed, these flanged edges 21 constituting additional means for preventing mice in the outer cage 5 from finding their way back into the box 7.

The portion of the front end wall 19 that projects above the top 13 of the outer cage 5 is provided with an opening 22, the bottom edge of which is flush, or nearly so, with the top 13.

The respective top edges of the walls 19 and 18 are bent inwardly, as shown at 23 and 24, so as to constitute parallel retaining flanges for a slidable cover 25 for the box 7, having a handle 26 of any suitable design.

Referring to the receiving or inner cage 6, this is also of substantially rectangular configuration, having perpendicular side walls 27, the upper edges of which are joined by a top 28. The front edge of the top 28 is preferably bent downwardly as shown at 29 so as to close substantially the space between the front edge of the top 28 and the front end wall 19 of the box 7. A closed bottom 30 is provided in the inner cage 6, and this is extended rearwardly past the rear edges of the sides and top of the inner cage, so as to provide a tailpiece, in which is formed a longitudinal slot 31. A weight 32 is formed with a vertically disposed bore in which is received the bolt 33, that is also passed through washer 34, whereby the bolt 33 is effectively retained in the slot 31. By means of the nut 35 cooperating with bolt 33, it is seen that the weight 32 may be secured in positions of longitudinal adjustment relative to the slot 31 and tailpiece. The inner cage 6 is further formed with a closure member 36, that is fixedly secured to, and depends from the front edge of, the bottom or floor 30 of the inner cage.

The closure member 36 is closely spaced from, and is curved correspondingly to, the front end wall 19 of the box 7. When the inner cage 6 is in the full line position shown in Figure 3, the closure member 36 constitutes a closure for the opening 20. Additionally, and as shown by dotted lines in Figure 3, the bottom edge of the closure member 36 is adapted to engage the bottom 16 of box 7, when the inner cage 6 is pivoted downwardly to the dotted line position. Thus, the inner cage 6 is effectively stopped in its downward movement at a desired point.

The inner cage 6 is mounted in the box 7 to swing in a vertical arc, by means of a balance or pivot shaft 37, that extends transversely of the inner cage 6, and is journalled in the side walls 27. As shown clearly by Figure 3, the balance or pivot shaft 37 is disposed rearwardly of the rear end wall 38 of the inner cage.

The ends of the shaft 37 are journalled in opposed bearing brackets 39 that are mounted on the side walls 17 of the box 7, said bearing brackets 39 additionally constituting spacing members, whereby the side walls 27 of the inner cage are spaced from the side walls 17.

In operation of a trap constructed in accordance with the invention, bait in the form of food is deposited in the trap at a desired point. Preferably, this is deposited on the bottom or base 8 of the outer cage 5, where it will be fully visible to, and easily capable of being scented by, the animals to be entrapped. The top 13 of the outer cage 5 constitutes a platform from which the animal may enter the cage, it being noted, as hereinbefore stated, that the lower edge of the inlet opening 22 is almost flush with the platform.

When the animal enters the trap through the opening 22, he will find himself in the inner cage 6. In this connection, the weight 32 will have previously been adjusted longitudinally, and secured in its position of adjustment, so that when the inner cage 6 is empty of animals, it will be in a position of level balance, as shown in Figure 3. However, when a mouse or other animal leaps to the floor 30 of the inner cage, the cage is immediately placed in a condition of over-balance, and pivots on the shaft 37 to the dotted line position shown in Figure 3.

As previously noted, the front and rear end walls 19 and 18 of the box 7 in which the inner cage 6 is mounted are of curved formation, conforming to parts of a circle. The point on which the inner cage 6 pivots constitutes the center of said circle, and accordingly, when the inner cage 6 is pivotally swung as indicated, the open front end of the inner cage 6, and the depending closure member 36, will remain equidistant from the front end wall 19 of the box 7, regardless of the position to which the inner cage 6 is pivotally swung.

As mentioned above, the bottom edge of the depending closure member 36 acts as a stop whereby to limit downward swinging of the inner cage 6. When the inner cage 6, under the weight of the mouse, is so swung, its open front end will register with the opening 20 from the box 7 into the outer cage 5. The animal will accordingly proceed through this opening into the outer cage 5.

As soon as the weight of the animal has been removed from the inner cage 6 in this manner, the inner cage will, under the action of the weight 32, swing upwardly into its normal position.

As a result, the closure member 36 will close the opening 20, thereby effectively retaining the animal in the outer cage 5.

It is an important characteristic, as noted from the above description of operation, that the trap will automatically reset itself, thereby permitting its use in repeated operations, to catch a number of mice or the like.

The box 7 is not fixedly secured in any way to the outer cage 5, and is merely deposited therein, with its bottom 16 resting on the bottom of the outer cage. As hereinbefore noted, the box 7 is positioned adjacent one side of the outer cage. Thus, an effective arrangement is provided, whereby any mice caught in the trap can be conveniently killed. This can readily be done by permitting the mice to enter the space between the screen side wall 12 of the outer cage and the adjacent side wall 17 of the box 7. The upper portion of the box 7 can then be gripped, and the box swung against the screen wall 12, for the purpose of killing or stunning the animal. Alternatively, the trap can be turned on its side, so that the screen side wall 12 thereof that is closest to the box 7, consitutes in effect a bottom for the trap. The mice can in this way be conveniently killed or stunned, by swinging the side wall 17 of the box 7 downwardly upon them.

Other methods of killing animals caught in the trap are, of course, possible within the spirit of the invention. Additionally, bait can be deposited in the trap at any point desired, and while preferably it is deposited on the floor or base 8 of the outer cage 5, it may if desired be secured to the floor 30 of the inner cage 6. Or, it can be hung from the platform 13 of the outer cage 5, downwardly within the outer cage, but out of reach of mice deposited on the floor of the outer cage.

In addition, it is within the spirit of the invention, and believed sufficiently obvious as not to require illustration or description, that the inner cage 6 may be pivotally mounted to the side walls 17 of the box 7 in any suitable manner, as by being journalled on pins projecting inwardly from the side walls 17.

What is claimed is:

1. A trap, comprising an outer cage, a box mountable therein, the walls of the box projecting partially above the cage, one of the walls having an opening in its projecting portion, and having an opening disposed below the first-named opening and in communication with the interior of the cage, an inner cage pivotally mounted in the box, the inner cage having an open front end normally registering with the first-named opening, the open front end being brought into register with the second-named opening upon pivotal movement of the inner cage, and means yieldably tending to retain the inner cage in normal position.

2. A trap, comprising an outer cage, a box-like structure extending above the top of the cage and in communication with the interior thereof, the structure having an inlet opening, an inner cage pivotally mounted therein for swingable movement in a vertical arc, the inner cage having an open front end normally in communication with the opening in the box-like structure, the open front end being brought into communication with the interior of the outer cage upon downward swinging of the inner cage, and counter-balancing means on the inner cage yieldably tending to retain the inner cage in normal position.

3. A trap, comprising an outer cage, a box removably mounted therein and projecting partially above the top of the cage, the box having vertically aligned openings formed in one wall, the upper of said openings opening from the outside of the cage and the lower of said openings opening into the interior of the cage, an inner cage pivotally mounted in the box for swingable movement in a vertical arc, the inner cage having an open front end, a weight mounted on the rear end of the inner cage, means for adjusting said weight longitudinally of the inner cage, the inner cage being pivotally connected to the box intermediate the ends of the inner cage, the open front end of the inner cage being normally in communication with the upper of the openings in the box, and being brought into communication with the lower of said openings upon downward pivotal swinging movement, a closure member depending from the front end of the inner cage and proportioned for closing the lower of the openings in the box during normal positioning of the inner cage, the closure member being proportioned to constitute a stop member for the inner cage limiting downward pivotal movement thereof.

4. A trap, comprising an outer cage and a box, the box having an inlet opening vertically disposed relative to the outer cage, an inner cage pivotally mounted in the box for swingable movement in a vertical arc, the inner cage having an open front end, and adjustable counter-balancing means on the inner cage tending to retain the inner cage with its open front end in communication with the inlet opening, the inner cage being swingable downwardly upon entry thereinto of an animal, the open front end being brought into communication with the interior of the outer cage upon downward swingable movement thereof.

TOM WILSON.

REFERENCES CITED

The following references are of record in the file of this patent:

UNITED STATES PATENTS

| Number | Name | Date |
|---|---|---|
| 1,757,218 | Richardson | May 6, 1930 |
| 1,769,453 | Parratt | July 1, 1930 |